United States Patent [19]

Eicken et al.

[11] Patent Number: 5,344,859

[45] Date of Patent: Sep. 6, 1994

[54] WATER-DILUTABLE BINDER MIXTURES BASED ON ALKYD RESINS AND POLY-N-ACYL ALKYLENEIMINES

[75] Inventors: Ulrich Eicken, Duesseldorf; Brigitte Hase, Erkrath; Manfred Gorzinski, Duesseldorf; Wolfgang Gress, Wuppertal; Norbert Stork, Duesseldorf, all of Fed. Rep. of Germany

[73] Assignee: Henkel Kommanditgesellschaft auf Aktien, Duesseldorf, Fed. Rep. of Germany

[21] Appl. No.: 866,161

[22] PCT Filed: Dec. 17, 1990

[86] PCT No.: PCT/EP90/02216

§ 371 Date: Aug. 7, 1992

§ 102(e) Date: Aug. 7, 1992

[87] PCT Pub. No.: WO91/09918

PCT Pub. Date: Jul. 11, 1991

[30] Foreign Application Priority Data

Dec. 27, 1989 [DE] Fed. Rep. of Germany ....... 3943112

[51] Int. Cl.$^5$ ................. C09D 167/08; C09D 179/02

[52] U.S. Cl. ................... 523/501; 523/503; 524/539; 524/599; 524/600; 524/601; 524/602; 524/604; 524/606; 524/607; 524/608; 525/38; 525/42; 525/43; 525/44; 525/47; 525/411; 528/403; 528/405

[58] Field of Search ............... 523/501, 503; 524/539, 524/599, 600, 601, 602, 604, 606, 607, 608; 525/42, 43, 44, 38, 47, 411; 528/403, 405

[56] References Cited

U.S. PATENT DOCUMENTS 3,483,141  12/1969  Litt et al. ..................... 528/402

FOREIGN PATENT DOCUMENTS 3428204  2/1986  Fed. Rep. of Germany.
3932375  10/1990  Fed. Rep. of Germany.

Primary Examiner—Frederick Krass
Attorney, Agent, or Firm—Ernest G. Szoke; Wayne C. Jaeschke; Norvell E. Wisdom, Jr.

[57] ABSTRACT

This invention includes new water-dilutable binder mixtures based on alkyd resins modified by poly{ethylene glycol} and poly{N-acyl alkylene imines}, a process for preparing such binder mixtures, and the use of such binders in oxidatively drying paints and varnishes.

19 Claims, No Drawings

WATER-DILUTABLE BINDER MIXTURES BASED ON ALKYD RESINS AND POLY-N-ACYL ALKYLENEIMINES

FIELD OF THE INVENTION

This invention relates to new water-dilutable binder mixtures based on alkyd resins and poly-N-acyl alkyleneimines, to processes for the production of the new binder mixtures and to their use in oxidatively drying paints.

STATEMENT OF RELATED ART

In principle, lacquers and paints are divided into physically drying systems and chemically drying systems. One form of chemically drying paints are oxidatively drying systems in which a crosslinking reaction is initiated by atmospheric oxygen. The most important oxidatively drying paints now contain binder mixtures based on alkyd resins in which highly unsaturated fatty acids are incorporated by condensation in the form of mixed polyesters. Binder mixtures containing so-called self-emulsifying alkyd resins, i.e. those which, by virtue of incorporated hydrophilic groups, can be emulsified in water without any need for external emulsifiers, are used for water-dilutable paints. Self-emulsifying alkyd resins in which polyethylene glycol is incorporated and of which the residual acid groups have been at least partly neutralized by addition of a base are often used as the binder component. The production of aqueous dispersions of such alkyd resins is described, for example, in DE-PS 28 09 840, in DE-PS 15 95 278 and in German patent application P 39 32 375.7. These aqueous alkyd resin dispersions have excellent stabilities. However, if they are used as sole binder component, these alkyd resin dispersions give water-dilutable paints or coatings which are in need of improvement in regard to their drying properties and in regard to film quality, particularly film hardness.

By contrast, quick-drying films combining high gloss with high hardness values are provided by paints of which the binders are based on poly-N-acyl alkyleneimines, particularly those according to German patent application P 39 00 859.2. However, most of the poly-N-acyl alkyleneimines used there are difficult to emulsify in water. Acceptable emulsifiability in water can only be achieved where poly-N-acyl alkyleneimine mixtures containing more than 50% by weight of ethyl oxazoline are used. However, a binder mixture of this type gives coatings which are extremely sensitive to water.

DESCRIPTION OF THE INVENTION

Object of the Invention

Accordingly, the problem addressed by the present invention was to provide binder mixtures which would advantageously combine the ready emulsifiability of alkyd resins with the favorable drying properties and film quality of poly-N-acyl alkyleneimines and processes for the production of such binder mixtures and to enable them to be used in oxidatively drying paints.

SUMMARY OF THE INVENTION

Accordingly, the present invention relates to water-dilutable binder mixtures suitable for oxidatively drying paints based on alkyd resins in which polyethylene glycol is incorporated and of which the residual acid groups have been at least partly neutralized by addition of bases, characterized in that, together with the alkyd resins, they contain poly-N-acyl alkyleneimines prepared by cationic polymerization of one or more monomers corresponding to general formula I:

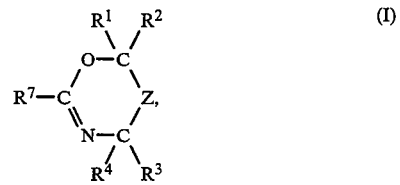

in which
Z is a direct bond or the group $>CR^5R^6$, where $R^5$ and $R^6$ may be-the same or different and represent H or alkyl containing up to 2 carbon atoms,
$R^1$ to $R^4$ may be the same or different and represent H, an aromatic or aliphatic radical containing up to 8 carbon atoms, and
$R^7$ is an aromatic or aliphatic radical, attached by carbon, containing up to 21 carbon atoms.

The binder mixtures according to the invention are based on alkyd resins which have been produced in known manner from monobasic and polybasic carboxylic acids and/or anhydrides thereof and polyhydric alcohols using polyethylene glycol and which have an acid value of 5 to 25.

DESCRIPTION OF PREFERRED EMBODIMENTS

Preferred alkyd resins are the alkyd resins which can be produced in accordance with German patent application P 39 32 375.7 where particular emphasis is placed on alkyd resins which have been produced from:
the polyhydric alcohols trimethylol propane and penta-erythritol in quantities of 20 to 40% by weight,
fatty acids or fatty acid mixtures in quantities of 20 to 45% by weight; the fatty acids should contain more than 12 carbon atoms and should be at least partly unsaturated,
aromatic monobasic carboxylic acids, such as benzoic acid and/or cyclic derivatives thereof in quantities of up to 25% by weight and
aromatic dicarboxylic acids and/or anhydrides, such as phthalic (anhydride), in quantities of 20 to 35% by weight using polyethylene glycol having an average molecular weight of 600 to 6,000 in quantities of more than 5 and less than 15% by weight (each component based on the alkyd-resin-forming reactant mixture).

Alkyd resins which have been produced from unsaturated fatty acids, such as peanut oil, cottonseed oil, soybean and/or sunflower oil fatty acid and/or palmitoleic acid, oleic acid, linoleic acid and/or linolenic acid and/or conjuene fatty acids have proved to be particularly suitable. Other suitable alkyd resins are alkyd resins which have been produced from oils, preferably semi-drying or non-drying oils, such as tung oil, castor oil, coconut oil, distel oil, and/or the oils derivable from the above-mentioned fatty acids.

The alkyd resins preferably used in accordance with the invention have an average molecular weight of 4,000 to 7,000.

The residual acid groups of the alkyd resins are at least partly neutralized by addition of a base, preferably to degrees of neutralization of more than 50% and, in particular, completely. Suitable bases are any volatile amines known to the expert, such as triethylamine, 2-amino-2-methylpropan-1-ol and/or ammonia.

The alkyd resins preferably used in accordance with the invention have a residual acid value below 25, preferably between 5 and 20 and, more preferably, between 10 and 15, the residual acid value taking into account both free and neutralized residual acid groups.

According to the invention, the binder mixture contains poly-N-acyl alkyleneimines produced by cationic polymerization from one or more monomers corresponding to general formula I:

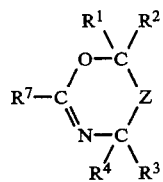

in admixture with and/or bonded to the alkyd resins. In the monomers corresponding to general formula I, Z may be a direct bond or may represent the group $>CR^5R^6$, where $R^5$ and $R^6$ may be the same or different and represent H or alkyl containing up to 2 carbon atoms. Mixtures of monomers corresponding to general formula I, in which Z is as defined above, may also be polymerized. The mixtures preferably contain monomers corresponding to general formula I, in which Z is a direct bond, in quantities of more than 50% by weight and, more particularly, in quantities of more than 75 to 100% by weight.

Monomers corresponding to general formula I, in which Z represents the group $>CR^5R^6$, are 6-membered rings which may be regarded as alkyl derivatives of the oxazines saturated in the 5,6-position. Monomers corresponding to general formula I, in which Z is a direct bond, are 5-membered rings which may be regarded as alkyl derivatives of the oxazoles saturated in the 4,5-position.

The monomers in question may be produced by typical cyclization or condensation reactions for cyclic imino-ethers as described, for example, in DE-PS 1 445 642 or in S. Kobayashi and T. Saegusa in *Ring-Opening Polymerization*, Vol. 2, London 1984, pages 762 et seq.

In the monomers corresponding to general formula I, the substituents $R^1$ to $R^4$ may be the same or different and represent hydrogen and/or aliphatic radicals (including by definition the alicyclic compounds) and/or aromatic radicals. The monomers preferably contain hydrogen and/or an aliphatic and/or an alicyclic radical containing up to 8 carbon atoms as the substituents $R^1$ to $R^4$. Particularly preferred substituents $R^1$ to $R^4$ are hydrogen and aliphatic radicals containing up to 3 carbon atoms. Monomers corresponding to general formula I, in which at least two of the substituents $R^1$ to $R^4$ are hydrogen, are preferred for the purposes of the invention.

Monomers in which three of the substituents $R^1$ to $R^4$ represent hydrogen and one of the substituents is an alkyl radical containing up to 3 carbon atoms or in which all the substituents $R^1$ to $R^4$ are hydrogen are particularly suitable. Monomers corresponding to general formula I in which Z is a direct bond and the substituents $R^1$ to $R^4$ are hydrogen atoms are most particularly preferred for the purposes of the invention. Monomers such as these are known to the expert as 4,5-dihydrooxazoles or rather 2-oxazolines. The 2-substituted oxazolines in turn may be obtained, for example, from the β-chloroethyl amides or from the ethanolamides of the corresponding carboxylic acids or carboxylic acid mixtures by dehydrohalogenation or dehydration.

The definition of the substituent $R^7$ derives from the preferred method of preparation of the monomers corresponding to general formula I, from carboxylic acids or carboxylic acid mixtures. Accordingly, the substituent $R^7$ in the monomers corresponding to general formula I is derived from an aliphatic or aromatic carboxylic acid $R^7$-COOH containing up to 22 carbon atoms. In one particular embodiment of the invention, the poly-N-acyl alkyleneimines are produced by cationic polymerization of monomers of different structure. Mixtures of monomers, corresponding to general formula I, which differ in the substituent $R^7$ ($R^7$ being derived from aliphatic and aromatic carboxylic acids $R^7$-COOH) are preferably used. In one particularly advantageous embodiment of the invention, the mixtures of monomers corresponding to general formula I partly contain monomers bearing an olefinically unsaturated aliphatic substituent in $R^7$. This substituent is preferably derived from mono- and/or polyunsaturated fatty acids containing 16 to 22 carbon atoms, such as palmitoleic acid (9c-hexadecenoic acid), petroselic acid (6c-octadecenoic acid), oleic acid (9c-octadecenoic acid), elaidic acid (9t-octadecenoic acid), ricinoleic acid (12-hydroxy-9c-octadecenoic acid), linoleic acid (9c,12coctadecadienoic acid), linolenic acid (9c,12c,15c-octadecatrienoic acid), gadoleic acid (9c-eicosenoic acid), arachidonic acid (5,8,11,14-eicosatetraenoic acid) and erucic acid (13c-docosenoic acid).

For the rest of the monomers corresponding to general formula I, $R^7$ is a substituent derived from aromatic carboxylic acids $R^7$-COOH containing up to 22 carbon atoms. Benzoic acid and/or cyclic derivatives thereof are particularly suitable as the aromatic carboxylic acid.

The mixture of monomers corresponding to general formula I may also contain monomers in which the substituent $R^7$ is derived from a saturated carboxylic acid $R^7$-COOH containing up to 22 carbon atoms. Suitable saturated carboxylic acids are both the lower carboxylic acids, such as acetic acid, propionic acid and caproic acid, and the higher carboxylic acids, such as lauric acid, palmitic acid, stearic acid, isostearic acid, 2-ethylhexanoic acid, cyclohexane carboxylic acid, myristic acid, and/or behenic acid.

In addition, the aromatic and/or aliphatic carboxylic acids $R^7$-COOH and the substituents $R^7$ derivable therefrom may additionally contain substituents, like hydroxyl groups, ether groups, ester groups, and halogens, which do not interfere with polymerization to the poly-N-acyl alkyleneimines.

According to the invention, mixtures of monomers corresponding to general formula I which contain monomers of which the substituent $R^7$ is derived from an unsaturated fatty acid in quantities of 25 to 95% by weight, preferably 50 to 90% by weight and, more preferably, 70 to 90% by weight and monomers of which the substituent $R^7$ is derived from benzoic acid and/or cyclic derivatives thereof in quantities of 5 to 50% by weight and preferably 10 to 30% by weight are preferably used for the production of the poly-N-acyl alkyleneimines. In addition, monomers containing an alkyl substituent $R^7$ derived from a saturated carboxylic acid may be present in quantities of 0 to 25% by weight. All these percentages by weight are based on the mixture of monomer reactants. Although larger quantities of the last-mentioned monomers are possible, they adversely affect the drying rate. Mixtures of monomers corresponding to general formula I which do not contain any monomers where the substituent $R^7$ is derived from a saturated carboxylic acid are particularly preferred.

Mixtures of monomers corresponding to general formula I, in which Z is a direct bond and $R^1$ to $R^4$ are hydrogen atoms (the so-called 4,5-dihydrooxazoles) and which contain monomers of which the substituent $R^7$ is derived from one of the fatty acids mentioned above in quantities of 25 to 95% by weight, preferably 50 to 90% by weight and, more preferably, more than 70% by weight and monomers of which the substituent $R^7$ is derived from benzoic acid and/or cyclic derivatives thereof in quantities of 5 to 50% by weight and preferably 10 to 30% by weight, are most particularly preferred for the purposes of the invention.

The cationic polymerization of the monomers corresponding to general formula I to poly-N-acyl alkyleneimines may be carried out to a substantially complete conversion. The composition of the poly-N-acyl alkyleneimine is determined by the choice of the monomer components. In the preferred embodiment of the invention, the poly-N-acyl alkyleneimines contain the monomers bearing the various substituents $R^7$ in substantially statistical distribution.

The polymerization may be initiated by cationic polymerization initiators known to one skilled in the art, such as trifluoromethanesulfonic acid methyl ester, boron trifluoride etherate, and/or toluenesulfonic acid methyl ester.

The binder mixtures according to the invention contain alkyd resins in quantities of 10 to 90% by weight and preferably in quantities of 50 to 75% by weight and poly-N-acyl alkyleneimines in quantities of 10 to 90% by weight and preferably 25 to 50% by weight. However, it is also possible and may be advantageous, depending on requirements, for the binder mixtures additionally to contain other binders, such as polyurethanes, polyacrylates, chlorinated rubber, or nitrocellulose. The other binders may be present in the binder mixtures according to the invention in addition to the alkyd resin/poly-N-acyl alkyleneimine combination in maximum mixing ratios of up to 1:1.

The present invention also relates to processes for the production of the water-dilutable binder mixtures. According to the invention, two different processes are particularly preferred. In process A, the alkyd resins, which contain polyethylene glycol in quantities of less than 15% by weight, based on the alkyd-resin-forming mixture of reactants, and which have a residual acid value below 25, are first prepared by methods known per se, more particularly by the method according to German patent application P 39 32 375.7. The poly-N-acyl alkyleneimines are separately prepared by cationic polymerization from the monomers already mentioned by methods known per se, more particularly by the method according to German patent application P 39 00 859.2.

The alkyd resins and poly-N-acyl alkyleneimines are then mixed together with intensive stirring at elevated temperature, for example at 100° to 175° C. and preferably at temperatures of around 150° C., in mixing ratios of alkyd resin to poly-N-acyl alkyleneimine of 10:1 to 1:10, preferably 5:1 to 1:5 and, more preferably, 3:1 to 1:1. Mixing may also be carried out in the presence of an organic solvent although this is not preferred. According to the invention, the binder mixture obtained after mixing of the alkyd resins with the poly-N-acyl alkyleneimines preferably has a residual acid value below 25, preferably in the range from 5 to 20 and, more preferably, in the range from 10 to 15. If the binder mixture has lower acid values, the mixture is preferably post-acidified with the dicarboxylic acids and/or anhydrides already mentioned with reference to the production of the alkyd resins in accordance with German patent application P 39 32 375.7, such as for example maleic anhydride, phthalic anhydride, succinic anhydride. The binder mixture is advantageously post-acidified at temperatures of up to 150° C. and preferably at temperatures of 100° to 150 ° C. The free hydroxyl groups still present in the alkyd resin presumably form free acid groups with the preferred anhydrides in the post-acidification step. Temperatures considerably higher than 150° C., more particularly temperatures above 200° C., should be avoided because otherwise the free fatty acid groups formed after post-acidification can react with further hydroxyl groups to form higher condensates, which is undesirable.

In principle, the residual acid groups of the alkyd resin may be neutralized before or after mixing of the alkyd resin with the poly-N-acyl alkyleneimines by addition of the bases already mentioned. Where the binder mixture is post-acidified, it is of advantage to neutralize the residual acid groups in one step after post-acidification.

The binder mixture according to the invention can also be prepared by method B. In method B according to the invention, the monomers corresponding to general formula I (oxazines or oxazolines) are polymerized in the alkyd resin. The polymerization of acrylic acid or methacrylic acid in an aqueous alkyd resin dispersion is already known and is described in DE-OS 31 32 937. In contrast to this process, the monomers are directly polymerized in the heated alkyd resin in the process according to the invention, for example at temperatures above 100° C. up to 200° C. and preferably at temperatures above 130° C. up to 170° C., after the addition of typical polymerization initiators. After the preferably complete or substantially complete polymerization of the monomers corresponding to general formula I in the alkyd resin, the binder mixture obtained shows a distinctly lower acid value than might be expected from pure mixing of alkyd resin with poly-N-acyl alkyleneimine. The polymerization of the monomers in the alkyd resin apparently uses some of the residual acid groups so that it is logical to assume that the poly-N-acyl alkyleneimines and/or fragments thereof are grafted onto the alkyd resin in method B. The bonding ratios per se have not yet been elucidated. At all events, it is of advantage to the emulsifiability of the binder mixture if, after polymerization of the monomers in the alkyd resin, the acid value of the binder mixture obtained is adjusted to between 10 and 25 by addition of the already mentioned dicarboxylic acids and/or anhydrides. Post-acidification is carried out in the same way as described for method A. After adjustment of the acid value, the residual acid groups of the binder mixture may be at least partly neutralized by addition of the bases already described, preferably to degrees of neutralization above 50% and, more particularly, completely.

According to the invention, both method A and method B are preferably carried out in the absence of an organic solvent although organic solvents may be used. Particularly suitable solvents are, above all, high-boiling organic solvents.

The present invention also relates to the use of the binder mixtures for oxidatively drying paints.

To this end, the binder mixtures according to the invention are converted with a solvent into a binder dispersion. Suitable solvents are water and/or water-miscible organic solvents, such as acetone and/or butanone. For environmental reasons, water is preferably used in predominant quantities and, in particular, exclusively as solvent.

In one particular embodiment, the binder mixtures are first dissolved in a water-miscible organic auxiliary solvent and then dispersed in water before the auxiliary solvent is preferably removed again.

The binder mixture is obtained in the form of a dispersion having a binder solids content of 20 to 60% by weight, preferably 30 to 50% by weight and, more preferably, 35 to 45% by weight.

The dispersion of the binder mixture shows excellent stability in storage and does not coagulate, for example after 3 months at temperatures of 50° C.

The binder mixture is advantageously used as a dispersion in paints in quantities of 15% by weight to 50% by weight and preferably in quantities of 20% by weight to 40% by weight, expressed as solids and based on paint.

Siccatives, pigments and, optionally, other typical additives may be added to the dispersion of the binder mixture to form excellent oxidatively drying paints which, despite short drying times, give films of high quality and high strength.

Suitable siccatives are any of the compounds known to one skilled in the art which are preferably added in quantities of 0.01 to 1% by weight and more preferably in quantities of 0.02 to 0.06% by weight, expressed as metal and based on paint. Smaller quantities than 0.01% by weight siccatives are also possible, although, under these conditions, paints give only slow-drying coatings. The typical additives include auxiliaries, such as fillers, reactive diluents, antiskinning agents, and/or flow control agents, which are added in the usual quantities for paints, preferably in quantities of 0 to 60% by weight and, more preferably, in quantities of 3 to 40% by weight, based on the total weight of the paint.

EXAMPLES

A) Production of a water-dispersible alkyd resin

EXAMPLE 1

In a 2 liter three-necked flask equipped with a nitrogen inlet, reflux condenser, and water separator, 281.0 g of an unsaturated fatty acid mixture (consisting of 6 to 9% by weight of saturated $C_{14-18}$ fatty acids, 24 to 28% by weight of oleic acid, 3 to 9% by weight of linoleic acid, and 58 to 62% by weight of a conjugately unsaturated $C_{18}$ fatty acid mixture (Edenor ® UKD 6010)) were heated with stirring for about 3 hours to 200° C. with 51.5 g of trimethylol propane, 146.0 g of pentaerythritol and 224.0 g of p-tert-butyl benzoic acid in the presence of 100.0 ml of xylene and 2.0 g of a tin-based esterification catalyst (Swedcat TM 3, a product of Swedstab). 41 ml of water was separated as condensate during the reaction.

After cooling of the reaction mixture, 146 g of pentaerythritol, 336 g of phthalic anhydride, and 106 g of polyethylene glycol having an average molecular weight of 3,000 were added and the mixture was reheated. Another 39 ml of water was separated as condensate.

After an acid value of 11.2 had been reached, the reaction was terminated and the xylene was subsequently removed in vacuo.

EXAMPLE 2

Example 2 was carried out in the same way as Example 1, except that 280 g of a fatty acid mixture containing 8% by weight of saturated $C_{14-18}$ fatty acids, 28% by weight of oleic acid, 62% by weight of linoleic acid, 1% by weight of a triunsaturated $C_{18}$ fatty acid and 1% by weight of a $>C_{18}$ fatty acid (Edenor ®SbO5, a product of Henkel KGaA) was used instead of the 281.0 g of the unsaturated fatty acid mixture of Example 1.

EXAMPLE 3

Example 3 was carried out in the same way as Example 2 except that 377 g of isophthalic acid were used instead of 336 g of phthalic anhydride.

EXAMPLE 4

Example 4 was carried out in the same way as Example 2 except that the quantity of the unsaturated fatty acid mixture of Example 2 was increased from 281 g to 560 g and the quantity of p-tert-butyl benzoic acid added was reduced from 224 g to 46 g.

EXAMPLE 5

Example 5 was carried out in the same way as Example 1 except that 281 g of a fatty acid mixture containing 10 % by weight of saturated $C_{12-16}$ fatty acids, 5% by of palmitoleic acid, 1% by weight of margaric acid, 2% by weight of stearic acid, 67% by weight of oleic acid, 12% by weight of linoleic acid, 1% by weight of linolenic acid and 2% by weight of $>C_{18}$ fatty acids (Edenor ®FTiO5, a product of Henkel KGaA) were used instead of the 281.0 g of the unsaturated fatty acid mixture of Example 1.

B) Production of the polyoxazolines

Oxazolines substituted in the 2-position which had been produced mainly from carboxylic acids or carboxylic acid methyl esters via the hydroxyethyl amides by dehydrating cyclization in accordance with earlier application EP 88 118 090.5 were used as starting materials. Even where they had been produced from carboxylic acid mixtures or methyl esters of carboxylic acid mixtures, the oxazolines were not subjected to fractional distillation, so that the substituents R in the oxazolines substantially corresponded in their composition to the compositions in the carboxylic acid or methyl ester mixtures (determination by capillary gas chromatography). Carboxylic acids or methyl esters were generally used in technical purity. The composition of the oxazolines used based on fatty acid mixtures (or methyl ester mixtures) of natural origin is shown in Table 1. The 2-oxazolines aryl-substituted in the 2-position, such as 2-phenyl-2-oxazoline, were produced by the process according to DE 39 14 133.

EXAMPLE 6

In a 1 liter three-necked flask equipped with a stirrer and reflux condenser, 380 g (1.25 mole) of oxazoline based on soybean oil fatty acid and 120 g (0.82 mole) of oxazoline based on benzoic acid were heated under nitrogen together with 2.4 g of trifluoromethane sulfonic acid methyl ester and stirred for 1 hour at 160° C. The polymer solidified on cooling to room temperature.

EXAMPLE 7

121.6 g of oxazoline based on soybean oil fatty acid and 14.7 g of oxazoline based on benzoic acid were polymerized as in Example 6 by addition of 0.65 g of trifluoromethyl sulfonic acid methyl ester.

TABLE 1

| Oxazoline produced from | Content of oxazolines Based on | % by weight |
|---|---|---|
| Soybean oil fatty acid (Edenor ® Sj, Henkel) | Saturated $C_{16-20}$ fatty acids | 17 |
| | Oleic acid | 26 |
| | Linoleic acid | 50 |
| | Linolenic acid | 7 |
| | Palmitic acid | 2 |
| Ricinoleic acid (Edenor ® Ri 90, Henkel) | Stearic acid | 1 |
| | Oleic acid | 5 |
| | Ricinoleic acid | 88 |
| | Linoleic acid | 4 |

EXAMPLE 8

60.8 g of oxazoline based on soybean oil fatty acid and 32.1 g of oxazoline based on ricinoleic acid and also 29.4 g of oxazoline based on benzoic acid were polymerized as in Example 6 by addition of 0.6 g of trifluoromethane sulfonic acid methyl ester.

C) Dispersion

EXAMPLE 9

100 g of the alkyd resin of Example 2 together with 100 g of the polyoxazoline of Example 6 were dissolved with stirring in 150 g of butanone. 2.7 g of triethyl amine was added to the clear solution obtained. 300 g of deionized water was then added with stirring, after which the butanone was removed by distillation. A fine-particle stable emulsion having a polymer solids content of 40% by weight was obtained.

D) Polymerization of the oxazolines in the alkyd resin

EXAMPLE 10

In a 2 liter three-necked flask equipped with a stirrer and reflux condenser, 500 g of the alkyd resin of Example 2 were heated under nitrogen to 120° C. together with 378 g of oxazoline based on soybean oil fatty acid and 122 g of oxazoline based on benzoic acid. After the addition of 2.8 g of trifluoromethane sulfonic acid methyl ester, the temperature was increased to 160° C. and the reaction mixture was stirred for 1 hour at that temperature.

After cooling under nitrogen to room temperature, 24.7 g of solid maleic anhydride was added. The reaction mixture was then reheated to 150° C. and stirred for another hour.

A resin having an acid value of 15 was obtained. This resin was dissolved in butanone as in Example 9 and, after the addition of triethyl amine, the resulting solution was dispersed in water.

E) Production of a clear lacquer

EXAMPLE 11

0.15 g of a siccative (Servosyn ™ WEB, Co siccative) containing 8% by weight of cobalt and 0.50 g of a siccative (Servosym WEM, Zr siccative) containing 12% by weight of zirconium were added with stirring to 100 g of the dispersion prepared by method C or method D.

A clear lacquer was obtained and was applied by knife-coating with a gap width of 100 μ.

The König pendulum hardnesses (DIN 53 157) of the clear lacquers based on various dispersions produced in accordance with Example 11 are shown in the following:

clear lacquer based on dispersions produced in accordance with Example 9 from equal quantities by weight of the alkyd resin of Example 2 and the polyoxazoline of Example 6: 1 day 23"; 7 days 46"; 14 days 63"; 50 days 105";

clear lacquer based on dispersions produced in accordance with Example 9 from equal quantities by weight of the alkyd resin of Example 3 and the polyoxazoline of Example 6:

1 day 28"; 7 days 49"; 14 days 69"; 50 days 112";

clear lacquer based on dispersions produced in accordance with Example 10: 1 day 22"; 7 days 34"; 14 days 61"; 50 days 100".

The invention claimed is:

1. Water-dilutable binder mixtures that are suitable for oxidatively drying paints, said binder mixtures comprising alkyd resins in which polyethylene glycol is incorporated and of which the residual acid groups have been at least partly neutralized by addition of bases, wherein the improvement comprises the presence in the binder mixtures of poly-N-acyl alkyleneimines prepared by cationic polymerization of at least two chemically distinct types of monomers corresponding to general formula I:

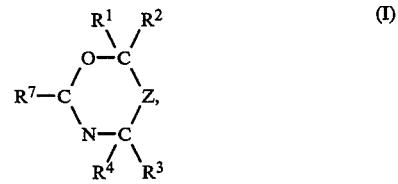

in which

Z is a direct bond or the group

where $R^5$ and $R^6$ may be the same or different and represent H or alkyl containing up to 2 carbon atoms, $R^1$ to $R^4$ may be the same or different and represent H, or an aromatic radical or aliphatic radical, each containing up to 8 carbon atoms, and $R^7$ is an aromatic or aliphatic radical, attached by carbon, containing up to 21 carbon atoms, wherein from 5 to 50% by weight of the monomers corresponding to general formula I have an aromatic radical as $R^7$, from 25 to 95% by weight of the monomers corresponding to general formula I have an olefinically unsaturated radical as $R^7$, and not more than 25% by weight of the monomers corresponding to general formula I have a saturated alkyl group as $R^7$.

2. Binder mixtures as claimed in claim 1, wherein the poly-N-acyl alkyleneimines present in the binder mixtures have been produced from monomers corresponding to general formula I in which all the substituents $R^1$ to $R^4$ are hydrogen atoms and Z is a direct bond.

3. Binder mixtures as claimed in claim 2, which contain poly-N-acyl alkyleneimines which have been produced by polymerization of a mixture of monomers comprising from 10 to 30% by weight of monomers with an aromatic moiety in $R^7$ and from 50 to 90% by weight of monomers with an olefinically unsaturated moiety in $R^7$, and, optionally up to 25% by weight of monomers with a saturated alkyl group as $R^7$.

4. Binder mixtures as claimed in claim 3, wherein the alkyd resin component has been produced by reacting monobasic and polybasic carboxylic acids, anhydrides thereof, or mixtures of acids and anhydrides with polyhydric alcohols including polyethylene glycol in quantities below 15% by weight, based on the mixture of alkyd-resin-forming reactants.

5. Binder mixtures as claimed in claim 4, wherein more than 50% of the residual acid groups of the alkyd resins are neutralized and the alkyd resins have a residual acid value above 5 and below 20, expressed as free and neutralized carboxylic acid groups.

6. Binder mixtures as claimed in claim 5, wherein the residual acid groups of the alkyd resins are at least partly neutralized with volatile amines, ammonia, or a mixture of ammonia and at least one volatile amine.

7. Binder mixtures as claimed in claim 6, comprising alkyd resins in quantities of 50 to 75% by weight in admixture with, bonded to, or both in admixture with and bonded to, poly-N-acyl alkyleneimines in quantities of 25 to 50% by weight, based on the binder mixture.

8. A process for the production of the binder mixtures claimed in claim 1, wherein the monomers corresponding to general formula I are polymerized in alkyd resin to form poly-N-acyl alkyleneimines, and, optionally, the reaction mixture obtained after polymerization of the monomers in the alkyd resin is reacted with dicarboxylic acids, anhydrides thereof, or a mixture of any two or more dicarboxylic acids and/or anhydrides of dicarboxylic acids.

9. A paint comprising binders as claimed in claim 7 in quantities of 20% by weight to 40% by weight, expressed as solids and based on paint.

10. Binder mixtures as claimed in claim 1, wherein the poly-N-acyl alkyleneimines present in the binder mixtures have been produced from monomers corresponding to general formula I in which the substituents $R^1$ to $R^4$ may be the same or different and represent H or alkyl radicals containing up to 3 carbon atoms, at least two of the substituents being hydrogen atoms.

11. Binder mixtures as claimed in claim 1, wherein the alkyd resin component has been produced by reacting monobasic and polybasic carboxylic acids, anhydrides thereof, or mixtures of acids and anhydrides with polyhydric alcohols including polyethylene glycol in quantities below 15% by weight, based on the mixture of alkyd-resin-forming reactants.

12. Binder mixtures as claimed in claim 1, wherein more than 50% of the residual acid groups of the alkyd resins are neutralized and the alkyd resins have a residual acid value above 5 and below 25, expressed as free and neutralized carboxylic acid groups.

13. Binder mixtures as claimed in claim 1, wherein the residual acid groups of the alkyd resins are at least partly neutralized with volatile bases.

14. Binder mixtures as claimed in claim 1, comprising alkyd resins in quantities of 10 to 90% by weight in admixture with, bonded to, or both in admixture with and bonded to, poly-N-acyl alkyleneimines in quantities of 10 to 90% by weight, based on the binder mixture.

15. A paint comprising binders as claimed in claim 1 in quantities of 20% by weight to 40% by weight, expressed as solids and based on paint.

16. A paint comprising binders as claimed in claim 6 in quantities of 20% by weight to 40% by weight, expressed as solids and based on paint.

17. A paint comprising binders as claimed in claim 5 in quantities of 20% by weight to 40% by weight, expressed as solids and based on paint.

18. A paint comprising binders as claimed in claim 2 in quantities of 15% by weight to 50% by weight, expressed as solids and based on paint.

19. A paint comprising binders as claimed in claim 1 in quantities of 15% by weight to 50% by weight, expressed as solids and based on paint.

* * * * *